United States Patent
Kalhoff et al.

(10) Patent No.: US 8,688,244 B2
(45) Date of Patent: Apr. 1, 2014

(54) METHOD FOR IDENTIFYING THE OPERATING STATE OF A CONTROL ELEMENT, AND A CONTROL APPARATUS

(75) Inventors: Johannes Kalhoff, Blomberg (DE); Thomas Huettemeier, Lange (DE)

(73) Assignee: Phoenix Contact GmbH & Co. KG (DE)

( * ) Notice: Subject to any disclaimer, the term of this patent is extended or adjusted under 35 U.S.C. 154(b) by 527 days.

(21) Appl. No.: 11/834,463

(22) Filed: Aug. 6, 2007

(65) Prior Publication Data
US 2008/0046102 A1   Feb. 21, 2008

(30) Foreign Application Priority Data
Aug. 16, 2006   (DE) .................. 10 2006 038 503

(51) Int. Cl.
| | |
|---|---|
| G05B 11/00 | (2006.01) |
| G05B 9/02 | (2006.01) |
| G06F 19/00 | (2011.01) |
| G05D 17/00 | (2006.01) |
| G05B 11/01 | (2006.01) |
| G08C 19/12 | (2006.01) |
| G08B 1/08 | (2006.01) |
| G01V 3/00 | (2006.01) |

(52) U.S. Cl.
USPC .............. 700/27; 700/21; 700/79; 700/177; 700/292; 340/12.51; 340/13.24; 340/539.24; 340/853.2; 901/6; 901/8; 901/49

(58) Field of Classification Search
CPC ............ B25J 13/06; G05B 2219/50198
USPC ........ 200/310; 700/27, 21, 79, 177, 245, 292; 901/1, 2, 6, 8, 49; 340/12.51, 12.54, 340/13.24, 532, 539.1, 539.23, 539.24, 340/853.2
See application file for complete search history.

(56) References Cited

U.S. PATENT DOCUMENTS 4,800,507 A * 1/1989 Brown ........................... 702/73
5,263,570 A * 11/1993 Stonemark ................. 198/502.1
(Continued)

FOREIGN PATENT DOCUMENTS

AT          006 728 U1    3/2004
DE          19919012 A1   11/2000
(Continued)

OTHER PUBLICATIONS

Signum 3SB3, Pushbutton Units and Indicator Lights, Siemens, 2002.*
(Continued)

Primary Examiner — Kavita Padmanabhan
Assistant Examiner — Darrin Dunn
(74) Attorney, Agent, or Firm — Kaplan Breyer Schwarz & Ottesen, LLP

(57) ABSTRACT

In order to flexibly identify the current operating state of control elements which are used to control a process installation, the invention provides a method for identifying the operating state of at least one control element, which is designed for an active and a passive operating state, for a control apparatus, wherein, in the active operating state, the control element controls a process function of an area of a process installation, comprising the following steps:
  the control apparatus is connected to the process installation,
  the control element is functionally associated with the process function, and
  the operating state of the control element is identified as active on the basis of successful functional association of the control element with the process function.
The invention also provides a control apparatus for controlling at least one process function for an area of a process installation, as well as a process installation which is suitable for carrying out the method according to the invention.

23 Claims, 5 Drawing Sheets

(56) References Cited

U.S. PATENT DOCUMENTS

Figure 1:
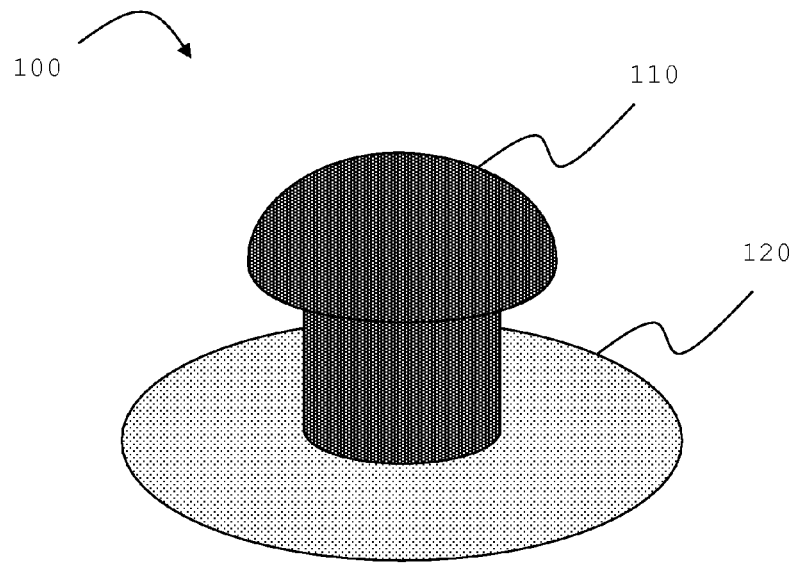

| | | | |
|---|---|---|---|
| 6,167,464 A * | 12/2000 | Kretschmann | 710/15 |
| 6,282,455 B1 * | 8/2001 | Engdahl | 700/83 |
| 6,507,762 B1 * | 1/2003 | Amro et al. | 700/83 |
| 7,060,922 B2 * | 6/2006 | Hoehne et al. | 200/314 |
| 7,116,993 B2 | 10/2006 | Farchmin et al. | 455/457 |
| 7,119,704 B2 * | 10/2006 | Grzan et al. | 340/665 |
| 7,298,275 B2 * | 11/2007 | Brandt et al. | 340/573.1 |
| 7,417,519 B2 * | 8/2008 | Miller | 335/186 |
| 7,432,463 B2 * | 10/2008 | Clegg et al. | 200/310 |
| 7,444,188 B2 * | 10/2008 | De Meyer et al. | 700/17 |
| 7,477,952 B2 * | 1/2009 | Bieber | 700/83 |
| 7,577,497 B2 * | 8/2009 | Johannessen et al. | 700/245 |
| 7,810,430 B2 * | 10/2010 | Chan et al. | 102/206 |
| 8,032,253 B2 * | 10/2011 | Nagata et al. | 700/251 |
| 2002/0054101 A1 * | 5/2002 | Beatty | 345/764 |
| 2002/0195883 A1 * | 12/2002 | Lazzaro | 307/326 |
| 2003/0140337 A1 * | 7/2003 | Aubury | 717/158 |
| 2004/0012393 A1 * | 1/2004 | Schmalz et al. | 324/424 |
| 2004/0140907 A1 * | 7/2004 | Morin et al. | 340/825.72 |
| 2004/0203874 A1 | 10/2004 | Brandt et al. | |
| 2004/0203930 A1 | 10/2004 | Farchmin et al. | |
| 2004/0204029 A1 * | 10/2004 | Parry | 455/552.1 |
| 2004/0260426 A1 * | 12/2004 | Johannessen et al. | 700/245 |
| 2004/0260518 A1 * | 12/2004 | Polz et al. | 702/188 |
| 2005/0021158 A1 * | 1/2005 | De Meyer et al. | 700/23 |
| 2005/0109395 A1 * | 5/2005 | Seberger | 137/8 |
| 2006/0106499 A1 * | 5/2006 | Roosli et al. | 700/276 |
| 2007/0174531 A1 * | 7/2007 | Liberty | 710/303 |
| 2007/0297890 A1 * | 12/2007 | Sjoberg et al. | 414/735 |
| 2008/0125908 A1 * | 5/2008 | Sjoberg | 700/247 |
| 2009/0030550 A1 * | 1/2009 | Nagata et al. | 700/251 |

FOREIGN PATENT DOCUMENTS

| | | | |
|---|---|---|---|
| EP | 1780738 A1 | | 5/2007 |
| JP | 2004319258 A | * | 11/2004 |

OTHER PUBLICATIONS

Yaskawa, JP2006300029 Robot System Japanese/English Translation, 2006.*

Okada, Japanese/English translation, 2003.*

Joseph Schriefl, "EP Patent Application No: EP 07 01 4843 Search Report", Nov. 23, 2007, Publisher: EPO, Published in: EP.

German Patent Office, "German Office Action for International Application No. 10 2006 038 503.9-55 dated Aug. 12, 2010", Aug. 12, 2010, Publisher: German Patent Office, Published in: DE.

* cited by examiner

METHOD FOR IDENTIFYING THE OPERATING STATE OF A CONTROL ELEMENT, AND A CONTROL APPARATUS

The invention relates in general to industrial process installations, and in particular to a method for identifying an operating state, as well as to a control apparatus and a process installation which are suitable for carrying out the method.

In safety engineering, emergency-off devices are used to stop machines and installations in the event of a fault or in the event of any danger to life and limb. Emergency-off devices are typically operated by a pushbutton whose switching element has a red actuator and has a yellow background. When the emergency-off device is operated, the machine or installation elements are switched to the safe state by means of an emergency stop. Emergency-off pushbuttons which are fitted such that they can be seen on machines must always be kept active in order to introduce a safe state in the event of a hazard. Since emergency-off pushbuttons which are not active but appear to be usable can lead to a safety risk, since operation does not lead to the machine or installation being stopped as expected, inactive switches must be removed, must be sealed such that they cannot be seen, or must be changed to a different color. This procedure is complex, and in some cases impracticable.

DE 199 19 012 A1 discloses a method for identifying emergency-off command devices which can be disconnected from an installation, with the emergency-off command device appearing in a neutral color when not alight and in a state in which they are not connected to the installation, with a specific coloring being activated only when they are functionally connected to the installation and/or a voltage is applied to the emergency-off command device. This method is, however, restricted to the emergency disconnection of an entire installation, and to the identification of corresponding emergency-off command devices.

The invention is therefore based on the object of finding a way in which the operating state of control elements for controlling a process installation or machine can be identified in a flexible form which can also be used, in particular, in complex installations or in machine groups.

The object is achieved in a surprisingly simple manner by a subject matter according to one of the attached independent claims. Advantageous embodiments and developments are described in the dependent claims.

The method according to the invention is used to identify the operating state of at least one control element, which is designed for an active and a passive operating state, for a control apparatus, wherein, in the active operating state, a process function of an area of a process installation is controlled by a control element, having the steps of the control apparatus being connected to the process installation, the control element being functionally associated with the process function, and the operating state of the control element being identified as active on the basis of successful functional association of the control element with the process function.

For the purposes of the present invention, the expression process installation covers any type of apparatus for automatically carrying out technical processes, such as manufacturing installations, automation installations, chemical process installations or any type of machine or machine group. In the active operating state, the control element controls a process function of at least one area of a process installation. An area such as this may be defined physically, for example by a boundary, or else may cover a predetermined machine or group of machines. The area can also be defined as a complete process installation.

The method allows a flexible association of different process functions with the control elements of a control apparatus, wherein the control elements are appropriately identified only when the functional association is successful. This allows a control apparatus to be flexibly matched to different requirements, with the operator of the control apparatus being informed about the operating state of the control elements by the appropriate identification, at all times.

The method can be used particularly advantageously in complex process installations with areas which need to be controlled separately from one another, such as a machine group with linked machines, in which case, for example, the aim is to carry out maintenance work on individual machines without having to interrupt the operation of the other machines.

The method according to the invention is particularly suitable for the use of control apparatuses which can be flexibly connected to the process installation, and disconnected again. The control apparatus is accordingly advantageously connected to the process installation by means of a cable connection. For a particularly high degree of mobility and flexibility, the control apparatus is connected to the process installation in a particularly preferred manner by means of a wire-free connection. This is particularly advantageous when using a control apparatus in the form of a portable control unit.

The method also allows flexible use of a control apparatus for a plurality of process installations. For this purpose, the method advantageously includes the steps of selecting a process installation and of automatically connecting the control apparatus to the selected process installation. The process installation is selected particularly advantageously by providing an identification unit, by connecting the identification unit to the control apparatus, and by transmitting identification information from the identification unit to the control apparatus, with the identification information uniquely identifying the process installation. An identification unit such as this, which is also referred to as a marker in the following text, allows the control apparatus to be associated with a selected process installation in a manner which is particularly simple and safe for the user.

Furthermore, the method advantageously includes the selection of an area of a process installation to be controlled by the control element of the control apparatus, with a process function of this selected area being controlled by the control element in the active operating state. A corresponding marker can also be used to select the area to be controlled.

For flexible association of different process functions, the method according to the invention advantageously includes the selection of a process function and the automatic functional association of the control element with the selected process function. Once again, the process function is particularly advantageously selected by providing an identification unit, by connecting the identification unit to the control apparatus, and by transmitting identification information from the identification unit to the control apparatus, with the identification information uniquely identifying the process function.

An identification unit, as has been described above, is particularly advantageously connected to the process installation and obtains the identification information from the process installation.

The marking can be provided by fixed coding, flexible assignment or else by indirect marking by means of a position identification, in which case known methods for position identification can be used, for example by using GPS (Global Positioning System) or wireless LAN (WLAN; wireless local area network). WLAN can in this case be used for position identification for example by evaluating the signal strengths of a plurality of surrounding access points.

The method accordingly advantageously includes a process installation being selected by automatic position identification by means of a position identification system which acts without contact being made, in particular using GPS or wireless LAN, and the control apparatus being manually or automatically connected to the selected process installation.

In another embodiment of the method according to the invention, the identification unit has a memory in which identification information is stored, with the identification information being logically linked to at least one process installation, to at least one area of a process installation, and/or to at least one process function.

Thus, depending on the requirement and the application, different identification units can be used for simple and flexible configuration of a control apparatus for controlling a process installation.

Since different process functions can be controlled by the control element, the process of identifying the operating state of the operating element as active preferably includes identifying the process function controlled by the control element. By way of example, this can be done by means of an automatic inscription on the control element, with the inscription uniquely identifying the process function controlled by the control element in the active state, or by means of suitable colored identification.

In one particularly preferred embodiment of the method according to the invention, the process function includes emergency disconnection of at least one area of the process installation and the step of identifying the operating state of the control element as active includes colored identification of the control element as an emergency-off control element in accordance with DIN EN Standard 418. In this embodiment, it is particularly preferable for the control element to be in the form of an emergency-off pushbutton, which is identified by coloring in the active state such that the operating element is in a red color, and the background to the operating element is in a yellow color.

In the active operating state, the control element of the control apparatus controls a process function of at least one area of a process installation. An area such as this may be defined physically, for example by a boundary, or else may include a predetermined machine or group of machines. The area may also include the entire process installation. The step of identifying the operating state of the control element as active accordingly advantageously includes identifying the area of the process installation controlled by the control element.

In a first variant, the controlled area is identified following successful functional association of the control element with the process function which is acting on the controlled area.

In a second variant, permanent identification of the area of the process installation to be controlled is provided, with the control element of the control apparatus being identified in the active operating state such that a user unambiguously associates the control element with the area to be controlled.

In a further embodiment, the method includes corresponding identification of the control apparatus and of an area of the process installation, with all of the control elements arranged on the control apparatus controlling process functions which act on the identified area.

By way of example, different areas of the process installation can each be provided with an alphanumeric identification, with the control apparatus having a digital display on which the area that is in each case being controlled is identified, when in the active state. The method particularly advantageously provides for corresponding colored identification of the controlled area and of the control element, and/or of the control apparatus, since this can be seen quickly and easily by a user.

The corresponding identification of the control element and the controlled area is provided at least in the active operating state of the control element, but may also still exist in the passive operating state, provided that the user can tell unambiguously by appropriate identification that the control element is in the passive operating state.

The method according to the invention also includes the step of identifying the operating state of the control element as passive, when the functional association between the control element and the process function is lost. This situation may occur, in the event of inadvertent deactivation or in the event of a fault such as loss of voltage or a wireless connection that is no longer intact.

The step of functional association of the control element with the process function preferably includes data being interchanged between the control apparatus and the process installation. For example, once the control apparatus has been connected to the process installation, it registers with a monitoring unit for the process installation, and requests the provision of a process function to be controlled by a control element of the control apparatus, and receives a confirmation message from the monitoring unit if the functional association between the control element and the process function is ensured.

A control apparatus according to the invention for controlling at least one process function of an area of a process installation has at least one control element, which is designed for an active and a passive operating state, wherein, in the active operating state, the control element controls the process function, and a device for automatically identifying the operating state of the control element.

In a first preferred embodiment, the control apparatus is in the form of an interchangeable process module for the process installation, for example one of a plurality of modules which can be used selectively depending on the requirement. These may, for example, be different process modules for product labeling, which are each configured for a different type of labeling. A control apparatus in the form of an interchangeable process module can preferably be designed to control process functions which act on the process installation itself, after connection to the process installation.

In a second preferred embodiment, the control apparatus is in the form of a portable control unit which can be connected to the process installation in order to control the process function. For example, the control apparatus may be in the form of a two-handed control section for assistance during the maintenance or adaptation of machines in a selected process area.

In order to ensure a high degree of mobility and flexibility, the control apparatus can preferably be connected to the process installation without the use of wires.

An identification unit which can be connected to the control apparatus can be used particularly advantageously for configuring the control apparatus. The identification unit is used for automatically identifying a process installation, an area of a process installation and/or a process function. For this purpose, appropriate identification information is transmitted from the identification unit to the control apparatus. The control apparatus is accordingly preferably designed to automatically produce a connection to a process installation identified by the identification information, in response to the received identification information, and/or to automatically functionally associate the control element with an identified process function or an identified process area.

Since a user can see a colored identification particularly easily and quickly, the control element preferably has at least one area which can be illuminated in a predetermined color. For identification by means of a color combination, the control element preferably has a first area which can be illuminated, within which an operating element is arranged which has a second area which can be illuminated, with the device for automatic identification being designed to illuminate the first and second areas which can be illuminated in each case in a predetermined color. This embodiment is particularly advantageous for automatically identifying the control element as an emergency-off control element in accordance with DIN EN Standard 418. In principle, the control element may have any desired number of areas, which can be illuminated in different colors, for colored identification. The areas which can be illuminated advantageously have a neutral coloring, such as gray, in the unilluminated state.

A process installation according to the invention has at least one identifiable process area and at least one control apparatus as described above for controlling at least one process function of the identifiable process area.

The invention will be described in more detail in the following text using, by way of example, preferred embodiments and with reference to the attached drawings. In this case, the same reference symbols in the drawings denote similar or identical parts.

Figure 2:
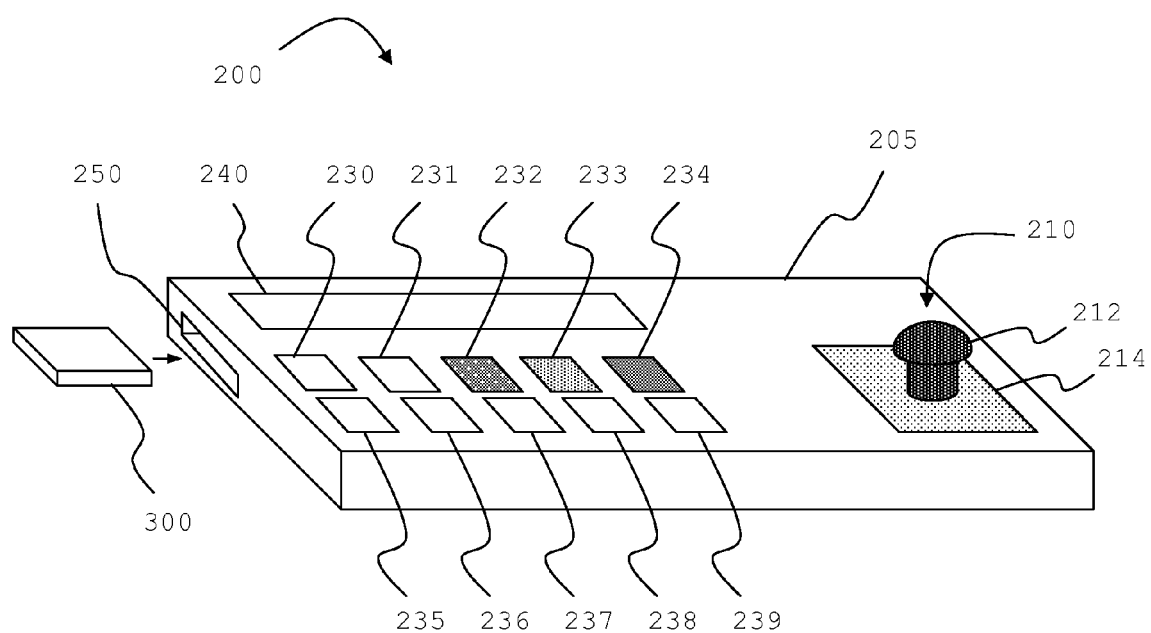
Figure 3:
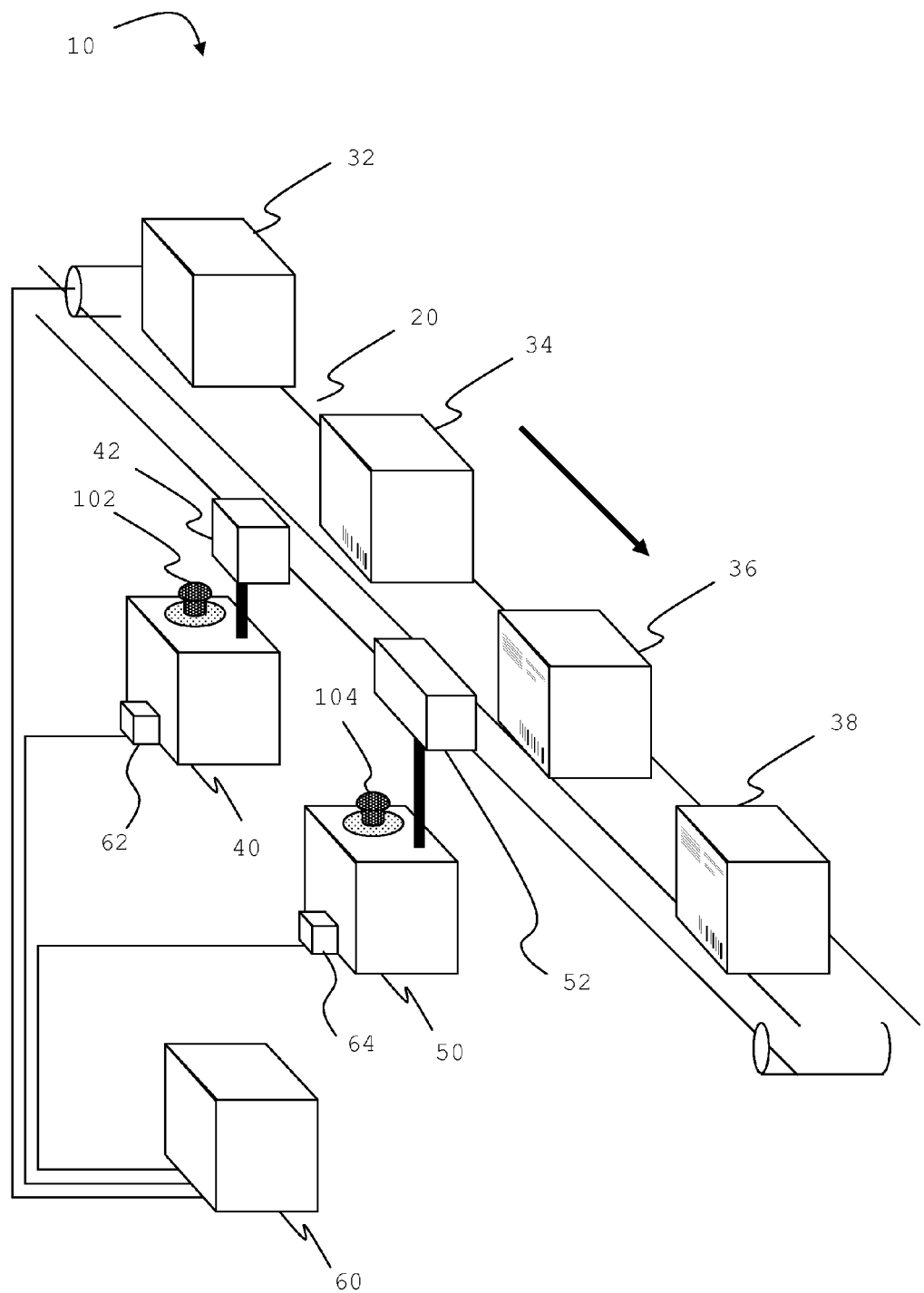
Figure 4:
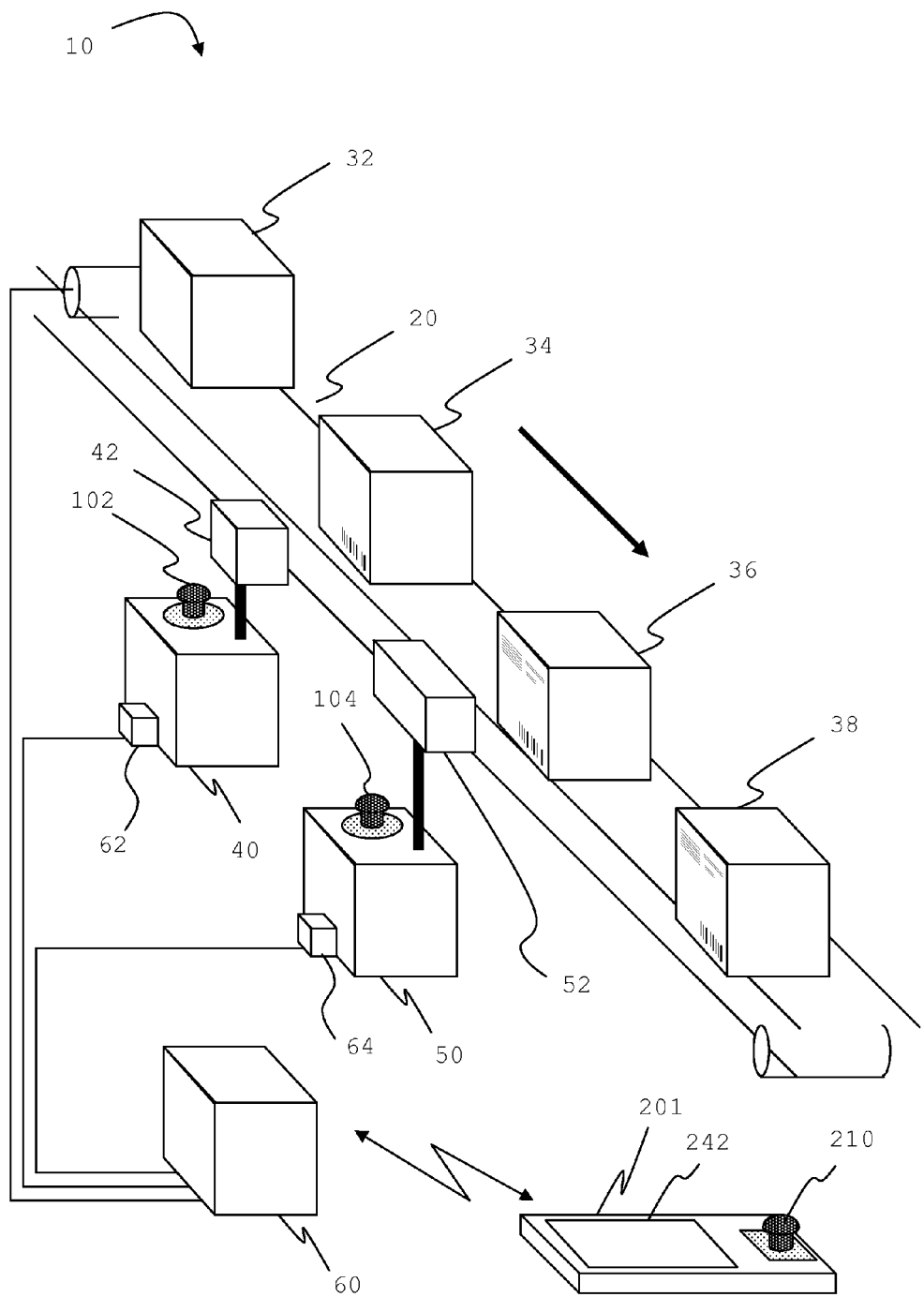
Figure 5A:
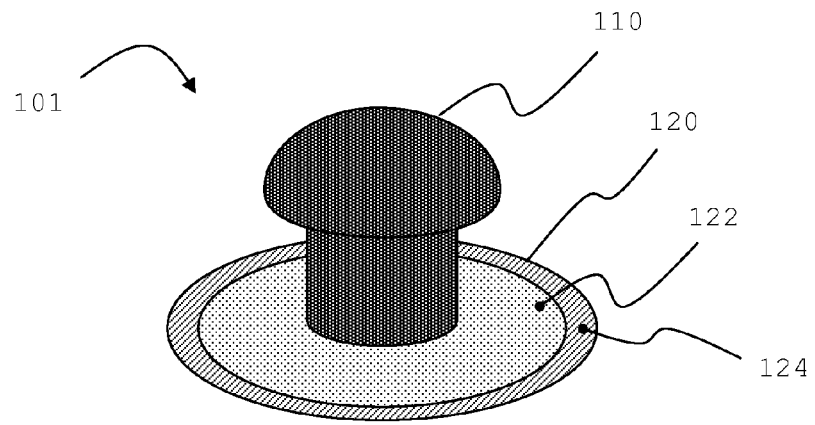
Figure 5B:
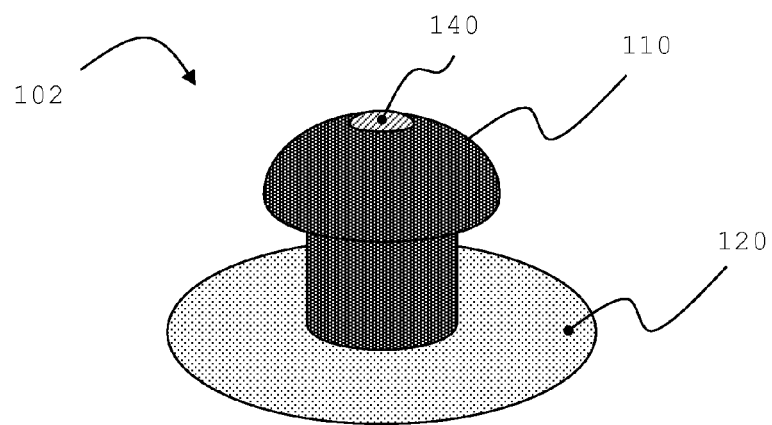
Figure 6:
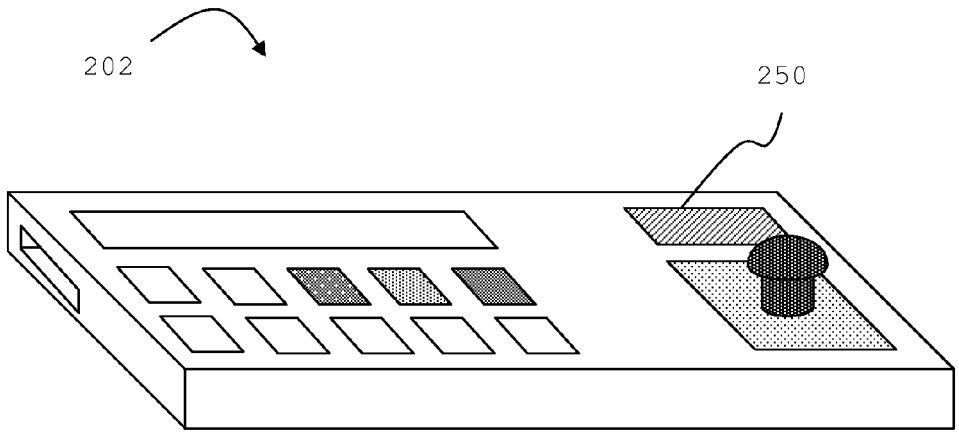
Figure 7:
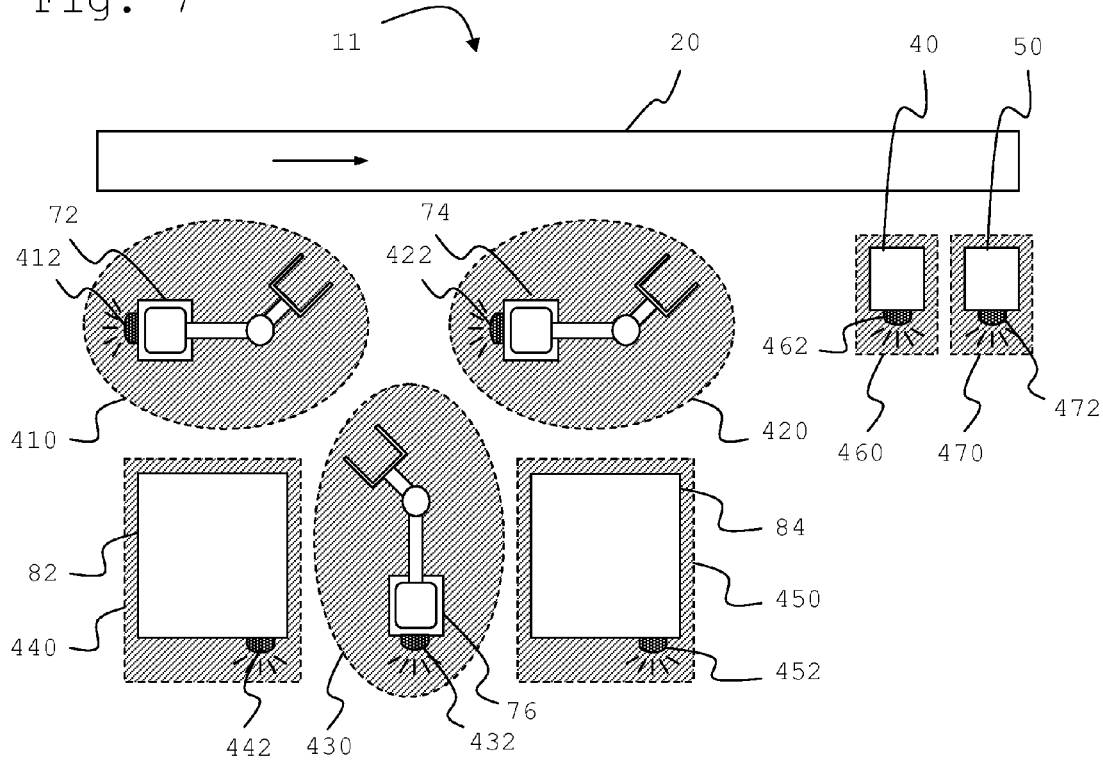
Figure 8:
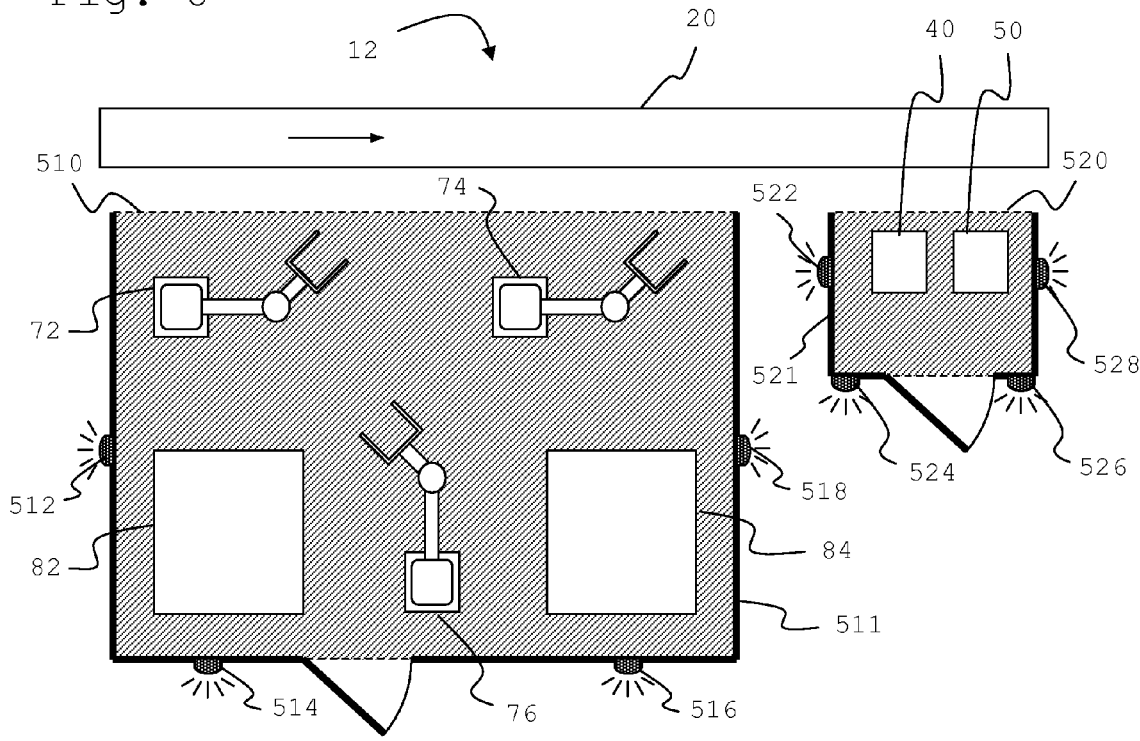

In the figures:

FIG. 1 shows a schematic illustration of an emergency-off control element,

FIG. 2 shows, schematically, one preferred embodiment of a control apparatus according to the invention in the form of a portable control unit, FIG. 3 shows a schematic illustration of a process installation having one preferred embodiment of a control apparatus according to the invention, in the form of an interchangeable process module, FIG. 4 shows the process installation from FIG. 3, additionally having a control apparatus which is in the form of a portable control unit and is connected to the process installation without the use of wires, FIG. 5a shows, schematically, a first preferred embodiment of an emergency-off control element, which is designed to identify the process area to be controlled, FIG. 5b shows, schematically, a second preferred embodiment of an emergency-off control element, which is designed to identify the process area to be controlled, FIG. 6 shows, schematically, one preferred embodiment of a control apparatus which is designed to identify the process area to be controlled, FIG. 7 shows a schematic illustration of a first preferred embodiment of a process installation according to the invention with identifiable process areas, and FIG. 8 shows a schematic illustration of a second preferred embodiment of a process installation according to the invention with identifiable process areas.

FIG. 1 shows a schematic illustration of an emergency-off control element 100 which is in the form of an emergency-off pushbutton and has a mushroom-shaped actuator 110 which is arranged on a bottom part 120 and is suitable for carrying out the method according to the invention. In the illustrated embodiment, the actuator 110 and the bottom part 120 have a transparent surface, which can be illuminated from the interior when the control element is installed. In the unilluminated state, the actuator 110 and the bottom part 120 are preferably of a neutral color, for example gray. In order to identify the operating state of the emergency-off control element as being active, the actuator is illuminated in the color red, and the bottom part in the color yellow, for example by means of appropriately colored lights.

One preferred embodiment of a control apparatus 200 according to the invention is illustrated in FIG. 2. In the illustrated embodiment, the control apparatus 200 has a housing 205 on which an emergency-off control element 210 with an actuator 212 which can be illuminated in the color red and a bottom part 214 which can be illuminated in the color yellow is arranged, in a similar manner to that illustrated in FIG. 1. Furthermore, the control apparatus 200 has a display 240 as well as further control elements 230 to 239 in the form of film pushbuttons, in which case control elements 230 to 239 are likewise designed such that they can illuminate in a colored form. Although the illustrated embodiment has only control elements in the form of pushbuttons, the invention is not restricted to control elements of this type. Any other types of control elements, such as switches, slide regulators or rotary regulators, joysticks or else touch-sensitive displays can also be used.

In order to hold an identification unit 300, a connecting element 250 is provided and allows data to be interchanged with the control apparatus 200 when the identification unit 300 is fitted. In this exemplary embodiment, the identification unit 300 has a memory which is not illustrated but in which information is stored which uniquely identifies a process installation to be controlled or an area of a process installation to be controlled as well as the associated controllable process functions. After receiving this information from the identification unit 300, the control apparatus 200 automatically signals to the identified process installation, preferably via a wire-free connection by means of a transceiver that is not illustrated. The identification unit 300 can be connected permanently to the control apparatus 200, or just for registration purposes.

After successful registration, a functional relationship between the control elements of the control apparatus 200 and the identified process functions is set up, with the operating state of the associated control elements being identified as active. In the active operating state as illustrated in FIG. 2, an emergency-off function, which can be controlled via the emergency-off control element 210, is available, as well as three further process functions, which can be controlled via the control elements 232, 233 and 234. These control elements are appropriately illuminated in order to identify the active operating state. The other control elements in this exemplary embodiment have no function, and are accordingly not illuminated.

In a further preferred embodiment, the control apparatus according to the invention is in the form of an interchangeable process module. This is illustrated by way of example in FIG. 3, which shows a process installation 10 with a conveyor belt 20 on which products 32, 34, 36 and 38 are transported in the direction of the arrow. The conveyor belt is controlled by the monitoring unit 60. Labeling modules 40 and 50 are used to label the products, and their labeling units 42 and 52 are in each case different, for different purposes. Even further variants, which are not illustrated, of labeling modules may be available. The labeling modules 40 and 50 are in the form of interchangeable process modules, in order to allow the labeling to be adapted as required. Connecting units 62 and 64 are provided for this purpose, by means of which the labeling modules 40 and 50 can be connected to the monitoring unit 60 for the process installation 10.

In the illustrated exemplary embodiment, the labeling modules 40 and 50 are each equipped with a respective emergency-off pushbutton 102 and 104, respectively, which are designed as described above in conjunction with FIG. 1. The respective emergency-off pushbuttons 102 and 104 are automatically identified as being active emergency-off pushbuttons by means of appropriate illumination, as soon as the respective labeling module 40 or 50 is connected to the process installation 10, in this case in particular to the monitoring unit 60, and the functional association has been produced between the emergency-off pushbutton 102 or 104 and the emergency disconnection function of the respective labeling module 40 or 50. As long as the respective labeling module 40 or 50 is not connected to the process installation, the respective emergency-off pushbutton 102 or 104 is in the passive operating state. In the present exemplary embodiment, emergency disconnection of the labeling modules 40 and 50 is provided by the monitoring unit 60. The functional association of the respective emergency-off pushbutton 102 or 104 with the process function of the emergency disconnection for the respective labeling module 40 or 50 may accordingly include data being interchanged between the labeling module and the monitoring unit 60, with the monitoring unit 60 acknowledging the availability of the process function. If the monitoring unit 60 is faulty, this reliably avoids incorrect identification of the emergency-off pushbutton 102 or 104 as being active.

FIG. 4 shows the process installation 10 from FIG. 3, but with a control apparatus according to the invention and in the form of a portable control module 201 additionally being provided, which can be connected via a wire-free connection to the monitoring unit 60 for the process installation 10. In this exemplary embodiment, no identification unit is used to identify a process installation and, instead, the control module 201 automatically identifies all the process installations within communication range, and displays these on the integrated touch-sensitive display 242. The user selects the process installation to be controlled and acknowledges the selection by an appropriate input using the touch-sensitive display 242. After selection of the process installation, a connection is automatically set up between the control apparatus and the monitoring unit 60 for the selected process installation 10. Once the connection has been set up, the monitoring unit 60 automatically transmits information about the controllable process functions of the process installation 10 to the control module 201. After receiving this information, the control elements of the control module 201 are functionally associated with the controllable process functions, and the control elements are appropriately identified, in order to indicate to the user that the control elements are in the active operating state. If, for example, an emergency-off function is available, a functional association is produced with the emergency-off pushbutton 210 for the emergency-off function and a correspondingly colored identification of the emergency-off pushbutton 210. In the illustrated exemplary embodiment, the other controllable process functions are carried out by appropriate user inputs using the touch-sensitive display 240. In this example, the display is identified as being active by displaying an appropriate function menu for controlling the process functions. If the display 240 shows no such indication, an incorrect indication or a selection menu for selecting a process installation to be controlled within communication range, then the user can see that the touch-sensitive display 240 is in the passive operating state as far as control of the process functions is concerned.

The identification of the operating state of the control element as being active particularly advantageously includes identification of the area of the process installation controlled by the control element. The controlled process area can be identified by a colored identification such that this can be seen visually, simply and quickly. FIGS. 5a and 5b show two appropriately designed embodiments of an emergency-off pushbutton, as a development of the emergency-off pushbutton 100 shown in FIG. 1.

The bottom part 120 of the emergency-off pushbutton 101 shown in FIG. 5a has two areas 122 and 124 which can be illuminated differently from the interior, in which case the area 122 for identification of the emergency-off function forms the direct visual background for the actuator 110, which can be illuminated in the color red, and whose background can be illuminated in the color yellow. The area 124, which is in the form of a colored border for the area 122, is used for colored identification of the process area controlled by the emergency-off pushbutton 101 and may, for example, be designed such that it can be illuminated from the interior in the color green or blue.

In the exemplary embodiment shown in FIG. 5b, the actuator 110 has an additional area 140 which can be illuminated in a color that can be selected and is used to identify the controlled process area.

FIG. 6 shows a control apparatus 202 according to the invention which, as a development of the control apparatus 200 shown in FIG. 2, additionally has an area 250 which can be illuminated in order to identify that the process area controlled by the control elements of the control apparatus 202 is in the active operating state.

The colored identification of the areas 124, 140 or 250 which can be illuminated is preferably provided in a corresponding manner to a corresponding color identification of the controlled process area. FIGS. 7 and 8 show examples of the color identification of process areas.

FIG. 7 shows an example of a process installation 11 in which products are fed in and transported away via a conveyor belt 20. The products are transported by means of a first robot arm 72 to a processing station 82, and from there to a packing station 84 by means of a second robot arm 76. From there, the products are transported by means of a third robot arm 74 to the conveyor belt 20 again. The products are then labeled using the labeling modules 40 and 50.

In the example illustrated in FIG. 7, each of the machines 72, 74, 76, 82, 84, 40 and 50 defines a process area 410, 420, 430, 440, 450, 460 and 470, respectively, indicating the operating area or the danger zone of the respective machine. For visual identification of the respective process area, each of the machines is provided with a colored light source 412, 422, 432, 442, 452, 462 and 472, respectively. By way of example, the process areas can be identified permanently, using different colors, depending on the application. In this case, a control element with a functional association with a process function which acts on a process area identified by a predetermined color is identified as being in the active operating state by using the same color. Alternatively, the respective process area does not need to be identified until successful functional association of the control element has taken place, in which case the same color can be used to identify different process areas.

FIG. 8 shows a further example of a process installation 12, in which the same machines 72, 74, 76, 82, 84, 40 and 50 are used as those in the process installation 11 shown in FIG. 7. In this example, two process areas 510 and 520 are defined, and each have a plurality of machines. The process areas 510 and 520 are physically bounded by guard fences 511 and 521, respectively, which are each provided with respective light sources 512, 514, 516 and 518, as well as 522, 524, 526 and 528, in order to identify the process areas.

In addition to the illustrated colored identification of the process areas it is, of course, also within the scope of the invention to use any other type of identification, such as alphanumerical coding.

The invention allows flexible identification of the operating state of control elements for controlling a process installation, an area of a process installation or individual machines. This means that current handling instructions, for example relating to closures which cannot be seen for controllers, are superfluous, and that errors and lack of knowledge can no longer lead to accidents and damage. Unambiguous association with permissible and currently active control and application parts means that even third parties, such as those not familiar with the machine and installation, can distinguish between active and inactive control elements, in particular emergency-off pushbuttons.

The visual assistance and the use of connections in the form of wires or without the use of wires as required, results in user-friendly handling, thus guaranteeing simple and safe handling. Even in the event of faults, such as a power failure or a wire-free connection that is no longer active, a safe state is ensured for the user since, in a situation such as this, an emergency-off pushbutton, for example, automatically switches from its active red/yellow identification to a neutral identification.

The invention claimed is:

1. A method for indicating the operating state of a control element, which can control different process functions and is a part of a control apparatus, the method comprising:
connecting the control apparatus to a machine group;
selecting a first process function from multiple process functions, that are acting on an area of the machine group comprising one or more machines, by the steps of:
(i) providing an identification unit,
(ii) connecting the identification unit to the control apparatus, and
(iii) transmitting identification information from the identification unit to the control apparatus, wherein the identification information uniquely identifies the process function;
transmitting a request, from the control apparatus to a monitoring unit for the machine group, in order to associate the control element functionally with the first process function, wherein the control element is capable of controlling the first process function when the control element is associated functionally with the first process function;
indicating the operating state of the control element as active when a confirmation message is received at the control apparatus from the monitoring unit in response to the transmitting of the request, the confirmation message signifying that the control element is successfully associated functionally with the first process function; and
indicating the operating state of the control element as passive when the control element becomes no longer associated functionally with the first process function.

2. The method as claimed in claim 1, wherein the control apparatus is connected to the machine group by means of a cable connection.

3. The method as claimed in claim 1, wherein the control apparatus is connected to the machine group by means of a wire-free connection.

4. The method as claimed in claim 3, further comprising:
selecting the machine group, wherein the control apparatus is automatically connected to the selected machine group.

5. The method as claimed in claim 3, further comprising:
selecting the machine group by automatic position identification by means of non-contacting position identification systems, wherein the control apparatus is manually or automatically connected to the selected machine group.

6. The method as claimed in claim 4, wherein the machine group is selected by:
providing an identification unit,
connecting the identification unit to the control apparatus, and
transmitting identification information from the identification unit to the control apparatus, wherein the identification information uniquely identifies the machine group.

7. The method as claimed in claim 1, comprising:
selecting the first process function, wherein the control element is automatically functionally associated with the selected first process function.

8. The method as claimed in claim 6, wherein the identification unit is connected to the machine group, and obtains the identification information from the machine group.

9. The method as claimed in claim 6, wherein the identification unit has a memory with identification information stored in it, wherein the identification information is logically linked to at least one of: i) the machine group, ii) the area of the machine group, and iii) the first process function of the multiple process functions.

10. The method as claimed in claim 1, wherein the step of indicating the operating state of the control element as active includes indicating the process function controlled by the control element.

11. The method as claimed in claim 1, wherein the first process function includes the emergency disconnection of at least one area of the machine group, and the step of indicating the operating state of the control element as active includes colored indication of the control element as an emergency-off control element in accordance with DIN EN Standard 418.

12. The method as claimed in claim 1, wherein the step of indicating the operating state of the control element as active includes indication of the area of the machine group controlled by the control element.

13. The method as claimed in claim 1, including corresponding indication of the control apparatus and of the area of the machine group controlled by the control element.

14. The method as claimed in claim 1, wherein the transmitting of the request includes data being interchanged between the control apparatus and the machine group.

15. A control apparatus connected to a machine group or process plant comprising one or more machines, the control apparatus comprising:
an identification unit which is connectable to the control apparatus; and
a control element for selecting a first process function from multiple process functions when the control element is associated functionally with the first process function by:
(i) connecting the identification unit to the control apparatus, and
(ii) transmitting identification information from the identification unit to the control apparatus, wherein the identification information uniquely identifies the process function,
the process functions being adapted to act on an area of the machine group comprising one or more machines,
the control apparatus being adapted to indicate an operating state of the control element as active or as passive, depending on whether the control element is successfully associated functionally with the first process function or not, the control apparatus further comprising:
- a transmitter for transmitting a request to a monitoring unit for the machine group, in order to associate the control element functionally with the first process function, wherein the control element is capable of controlling the process function when associated functionally with the process function; and
- a device for indicating the operating state of the control element i) as active when a confirmation message that signifies successful functional association of the control element with the first process function is received at the control apparatus from the monitoring unit in response to a transmitting of the request, and ii) as passive when the control element becomes no longer associated functionally with the first process function.

16. The control apparatus as claimed in claim 15, wherein the control apparatus is in the form of an interchangeable process module for the machine group.

17. The control apparatus as claimed in claim 15, in the form of a portable control unit that can be connected to the machine group in order to control the first process function.

18. The control apparatus as claimed in claim 15, wherein the control apparatus can be connected to the machine group without the use of wires.

19. The control apparatus as claimed in claim 15, wherein the identification information uniquely identifies a machine group, and the control apparatus is designed for automatic connection to the identified machine group.

20. The control apparatus as claimed in claim 15, wherein the identification information uniquely identifies a process function, and the control apparatus is designed for automatic functional association of the control element with the identified process function.

21. The control apparatus as claimed in claim 15, wherein the device for automatically indicating the operating state of the control element is designed to indicate the control element as an emergency-off control element in accordance with DIN EN Standard 418.

22. The control apparatus as claimed in claim 15, wherein the control element has a first area that can be illuminated, within which an operating element is arranged which has a second area that can be illuminated, and the device for automatically indicating the operating state of the control element is designed to illuminate the first and the second area that can be illuminated, in each case in a predetermined color.

23. A machine group, comprising:
- at least one process area that can be identified, and
- at least one control apparatus as claimed in claim 15 for controlling at least one process function of the process area that can be identified.

* * * * *